Oct. 26, 1948.                 R. B. ALLNUTT ET AL                 2,452,031
                           TORSIONAL OSCILLATION GENERATOR
                                Filed Aug. 8, 1946
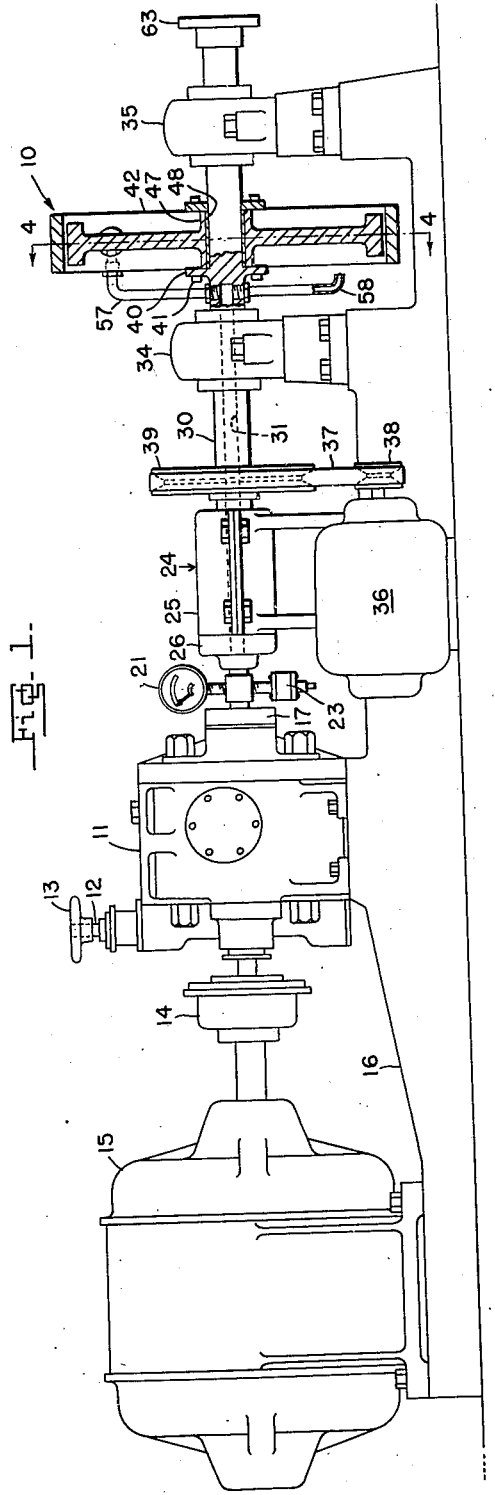
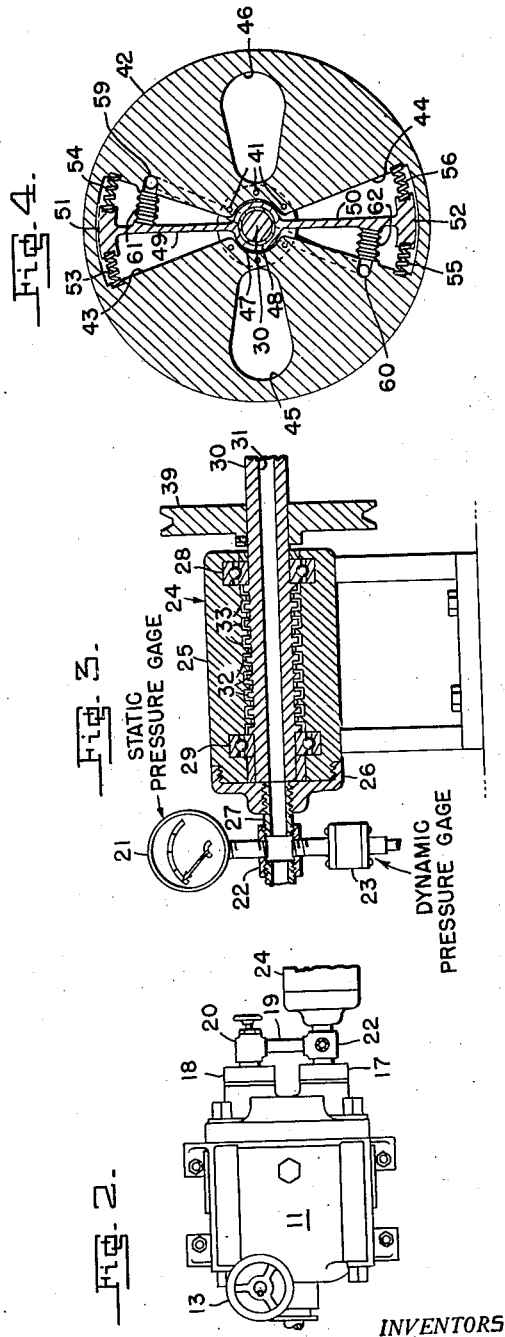
INVENTORS.
Ralph B. Allnutt
Raymond T. McGoldrick
BY
M. O. Hayes
ATTORNEY.

Patented Oct. 26, 1948

2,452,031

UNITED STATES PATENT OFFICE 2,452,031

TORSIONAL OSCILLATION GENERATOR

Ralph B. Allnutt, Glen Echo Heights, Md., and Raymond T. McGoldrick, Brooklyn, N. Y.

Application August 8, 1946, Serial No. 689,131

3 Claims. (Cl. 73—1)

(Granted under the act of March 3, 1883, as amended April 30, 1928; 370 O. G. 757)

The invention relates to improvements in equipment for generating torsional vibrations in rotating shafts and more specifically to a torsional vibration generator particularly well adapted for use in calibrating various forms of torsiographs such as disclosed in Patents 2,219,298; 2,254,172; and 2,399,635 granted to Dashefsky, Draper and Hope, respectively.

The primary object of the invention is the provision of a torsional oscillation generator having means for independently varying the amplitude and frequency of the torsional oscillations, as well as the shaft speed, while the machine is in motion.

Another object of the invention is the provision of a torsional oscillation generator having means for controlling the frequency of oscillations independent of the shaft speed.

A further object is to provide a torsional oscillation generator having means for adjusting the amplitude of oscillations independent of the shaft speed.

A still further object is to provide a torsional oscillation generator having means for varying the frequency and amplitude of oscillations independent of the shaft speed.

The invention also aims to provide a torsional oscillation generator having means for determining and adjusting the amplitude of the oscillations.

Additionally, the invention is directed toward the provision of a torsional oscillation generator which is constructed chiefly from commercially available parts.

Other objects and advantages of the invention will be apparent during the course of the following detailed description, taken in connection with the accompanying drawing, forming a part of this specification, and in which drawing, Figure 1 is a side elevational view of the torsional oscillation generator with parts thereof broken away and shown in central vertical section.

Figure 2 is a fragmentary top plan view of a pump and hydraulic connections preferably forming part of the oscillation generator.

Figure 3 is a fragmentary detail view, partly in side elevation and partly in central vertical section, of a rotary pipe coupling preferably forming part of the oscillation generator.

Figure 4 is a central vertical cross-sectional view of the oscillation generator, substantially on the line 4—4 of Figure 1.

In the drawing, which for the purpose of illustration shows only a preferred embodiment of the invention, and wherein similar reference characters denote corresponding parts throughout the views, 10 generally designates the torsional oscillation generator which may include a Waterbury variable stroke pump 11 such as disclosed in U. S. Patent 2,168,658, granted on the invention of W. Thomas. Briefly, the Waterbury variable stroke pump is a reciprocating piston pump of the parallel rotary cylinder type provided with a control shaft 12 turnable as by a handwheel 13 to vary the piston stroke and thus the quantity of fluid delivered. If a conventional seven-piston Waterbury pump produces a flow of oil that is substantially continuous, it will be necessary to use a pump having fewer pistons so that distinct and substantially independent rather than smoothly overlapping impulses will be produced.

Operatively connected to the pump 11 as by a shaft coupling 14 is a variable speed motor 15 supported with the pump 11 on a common baseplate 16. Connecting the outlet and inlet ports 17, 18 of the pump is a hydraulic conduit 19 provided with a control valve 20 for regulating the oil pressure in the conduit. The mean static pressure produced by the pump 11 may be measured by a suitable static pressure gage 21 carried by a T 22 forming part of the conduit 19. Also carried by the T is a suitable dynamic pressure gage 23 which may be of the diaphragm type shown in U. S. Patent 2,360,886, granted to Osterberg.

Mounted on the baseplate 16 is a rotary pipe coupling 24 including a cylindrical housing 25 connected at one end, as by a removable cap 26 and pipe 27, to the T 22. Rotatably supported in the housing 25, as by spaced bearings 28, 29, is one end portion of a shaft 30 having an axial passageway 31 communicating with the pipe 27. The shaft 30 is provided with a series of spaced annular ribs 32 closely fitting in spaced annular grooves 33 internally of the cylindrical housing 25 whereby a labyrinth is formed in the space between the housing and shaft tending to prevent the escape of oil from the housing. Externally of the housing 25 and shaft 30 is supported in spaced bearings 34, 35 for rotation by a variable speed electric motor 36 through a flexible V-belt 37 and pulleys 38, 39. The belt drive tends to prevent transmission of torsional vibrations between the shaft 30 and the motor 36.

Fixed to the shaft 30 between the spaced bearings 34, 35 at an integral annular flange 40, as by bolts 41, is a supporting member or flywheel 42 provided with opposite substantially sector-shaped openings 43, 44. Additional openings 45, 46 may be provided for balancing, if necessary. Mounted for oscillation on the shaft, as by a hub 47 and bushing 48, are diametrically opposite arms 49, 50 disposed within the sector-shaped openings 43, 44 and provided at their free outer ends with weights 51, 52. Interposed between the weights 51, 52 and the sidewalls of the sector-shaped openings 43, 44 are compression coil springs 53, 54, 55, 56, urging the weights toward the centers of the openings 43, 44. Communicating with the end portion of the axial passageway 31, which terminates adjacent the zone of connection of the flywheel and shaft, are tubes 57, 58 that extend radially outward from the shaft 30 and supply oil to suitable flywheel ducts 59, 60 leading into expansible bellows 61, 62. These bellows are disposed between the flywheel and arms 49, 50 so that expansion of the bellows will unbalance springs 53, 54, 55, 56 and thus displace the arms and weights 51, 52 in a counter-clockwise direction as viewed in Figure 4.

An adapter 63 is fastened to the outer end of the shaft 30 for connection to any selected torsiograph to be calibrated.

During operation of the universal torsional calibrator, successive impulses produced by the variable stroke pump will be transmitted through the shaft passageway 31, tubes 57, 58 and ducts 59, 60 to the bellows 61, 62 so as to effect oscillation of the weights 51, 52 near the outer periphery of the flywheel thus producing torsional oscillations of the shaft. The speed of the torsion shaft 30 may be adjusted by varying the speed of the electric motor 36; the frequency of torsional oscillations generated in the shaft may be adjusted by varying the speed of the pump motor 15; and the amplitude of oscillations generated may be varied by adjusting the stroke of the pump 11 by rotation of the control shaft handwheel 13. The mean static pressure of oil in the conduit 19 as indicated by gage 21 will depend on the setting of control valve 20 and on the operating speed and stroke of the pump 11. Thus adjustments for any combination of shaft speed, torsional vibration frequency, and amplitude can be made while the machine is in motion. Any selected torsiograph connected to the adapter 63 may be subjected to torsional vibrations of various known frequencies and amplitudes at which the torsiograph is to be calibrated, the frequency and amplitude of torsional vibration at any moment being indicated by the dynamic pressure gage, whereby the torsiograph may be calibrated or checked under known conditions.

The bellows 61, 62 provide a certain amount of damping between the flywheel 42 and arms 49, 50.

If desired, additional damping between the flywheel and arms 49, 50 may be provided to increase the frequency range of the calibrator.

Various changes may be made in the form of invention herein shown and described without departing from the spirit of the invention or the scope of the following claims.

The invention described herein may be manufactured and used by or for the Government of the United States of America for government purposes without the payment of any royalties thereon or therefor.

We claim:

1. In a torsional oscillation generator a drive shaft, a flywheel element, a weight element, one of said elements being fastened to the shaft, the other of said elements being mounted for oscillation relative to the first-mentioned one, means rotating the shaft at any selected speed, a hydraulic motor for oscillating the weight relative to the flywheel, a variable displacement pump having its output connected to said motor, and means operating the pump at any selected speed.

2. In a torsional oscillation generator, a drive shaft having an axial passageway, a variable displacement hydraulic pump, means supplying said shaft passageway with hydraulic fluid from said pump, a flywheel element, a weight element, one of said elements being fastened to the shaft, the other of said elements being mounted for oscillation relative to the first-mentioned one, means rotating the shaft at any selected speed, a hydraulic motor for oscillating the weight relative to the flywheel, a conduit for transmitting fluid pressure from said shaft passageway to said hydraulic motor, and means operating the pump at any selected speed.

3. In a torsional oscillation generator as specified in claim 2, means for measuring the instantaneous hydraulic pressure supplied by said pump to said driven shaft.

RALPH B. ALLNUTT.
RAYMOND T. McGOLDRICK.

REFERENCES CITED

The following references are of record in the file of this patent:

UNITED STATES PATENTS

| Number | Name | Date |
|---|---|---|
| 1,531,563 | McDowell | Mar. 31, 1925 |
| 1,610,487 | Brinton | Dec. 14, 1926 |
| 1,677,884 | Connelly | July 24, 1928 |
| 2,069,271 | Prescott | Feb. 2, 1937 |
| 2,384,987 | Dudley | Sept. 18, 1945 |